(12) United States Patent
Prieto

(10) Patent No.: US 9,121,233 B2
(45) Date of Patent: Sep. 1, 2015

(54) MITIGATION OF DOWNHOLE COMPONENT VIBRATION USING ELECTROMAGNETIC VIBRATION REDUCTION

(71) Applicant: Carlos A. Prieto, Houston, TX (US)

(72) Inventor: Carlos A. Prieto, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 363 days.

(21) Appl. No.: 13/777,525

(22) Filed: Feb. 26, 2013

(65) Prior Publication Data

US 2014/0238662 A1 Aug. 28, 2014

(51) Int. Cl.
*E21B 17/07* (2006.01)
*F16F 7/10* (2006.01)
*F16F 15/00* (2006.01)

(52) U.S. Cl.
CPC ............ *E21B 17/07* (2013.01); *F16F 7/1011* (2013.01); *F16F 15/005* (2013.01)

(58) Field of Classification Search
CPC ......... F16F 7/10; F16F 7/1011; F16F 7/1005; F16F 15/005; F16F 2222/06; E21B 17/07
See application file for complete search history.

(56) References Cited

U.S. PATENT DOCUMENTS

| | | | |
|---|---|---|---|
| 3,947,008 A | 3/1976 | Mullins | |
| 4,101,008 A | 7/1978 | Frosch et al. | |
| 6,019,201 A | 2/2000 | Gordaninejad et al. | |
| 6,257,356 B1 | 7/2001 | Wassell | |
| 7,036,612 B1 * | 5/2006 | Raymond et al. | 175/321 |
| 7,219,752 B2 | 5/2007 | Wassell et al. | |
| 7,377,339 B2 | 5/2008 | Wassell et al. | |
| 8,087,476 B2 | 1/2012 | Wassell et al. | |
| 8,172,209 B2 | 5/2012 | Muraoka | |
| 2006/0243489 A1 | 11/2006 | Wassell et al. | |
| 2010/0224410 A1 | 9/2010 | Wassell et al. | |
| 2010/0258352 A1 | 10/2010 | Aldraihem et al. | |
| 2011/0011644 A1 | 1/2011 | Pabon et al. | |

(Continued)

FOREIGN PATENT DOCUMENTS

WO 2007036722 A1 4/2007

OTHER PUBLICATIONS

APS Technology, "Active Vibration Damper Sub". www.aps-tech.com. Technical Data Sheet. 2 pages. 2013.

(Continued)

*Primary Examiner* — Giovanna C Wright
(74) *Attorney, Agent, or Firm* — Cantor Colburn LLP

(57) ABSTRACT

An apparatus for reducing vibration in a downhole component includes: an electrically conductive auxiliary mass attached to the component and configured to vibrate in a direction corresponding to a direction of downhole component vibration and absorb a portion of the downhole component vibration; and a magnetic component configured to generate a magnetic field through the auxiliary mass having a direction at least partially perpendicular to the direction of auxiliary mass vibration, the magnetic field configured to induce a current in the auxiliary mass in response to auxiliary mass vibration. The apparatus has an auxiliary mass vibration frequency tuned relative to a selected natural vibration frequency of the downhole component to reduce vibration of the downhole component, the auxiliary mass vibration frequency based on a magnetic stiffness of the auxiliary mass, the magnetic stiffness based on a strength of the magnetic field and/or a resistance of the auxiliary mass.

19 Claims, 6 Drawing Sheets

(56) References Cited

U.S. PATENT DOCUMENTS

| | | |
|---|---|---|
| 2011/0120772 A1 | 5/2011 | McLoughlin et al. |
| 2012/0103689 A1 | 5/2012 | Hutchinson |
| 2014/0202812 A1* | 7/2014 | Hauf .............................. 188/380 |

OTHER PUBLICATIONS

Bodycote, "Extending Valve Life: The Art of Heat Treating and Ceramic Coatings" Presented at the 2012 VMA Technical Seminar and Exhibition. Mar. 13, 2012, 34 pages.

Bomarito, "A Study on Energy Harvesting Through the Use of Electromagnetic Dampers in Motion Control Schemes". Cornell University, 2009. Massachusetts Institute of Technology, Jun. 2010, pp. 1-30.

Cobern, et al. "Drilling Tests of an Active Vibration Damper". SPE/IADC 105400. 2007 SPE/IADC Drilling Conference held in Amsterdam, The Netherlands, Feb. 20-22, 2007.

Notification of Transmittal of the International Search Report and the Written Opinion of the International Searching Authority, or the Declaration; PCT/US2014/018222; Mailed May 27, 2014, 14 pages.

* cited by examiner

MITIGATION OF DOWNHOLE COMPONENT VIBRATION USING ELECTROMAGNETIC VIBRATION REDUCTION

BACKGROUND

Various types of drill strings are deployed in a borehole for exploration and production of hydrocarbons. A drill string generally includes drill pipe and a bottomhole assembly (BHA). While deployed in the borehole, the drill string may be subject to a variety of forces or loads. For example, the BHA or other components can experience vibrations having various frequencies. Such vibrations, including high frequency vibrations, can cause irregular downhole rotation and reduce component life. Vibrations near the drill bit reduces the rate of penetration, increases wear damage and results in an overall rise in the cost of the operation.

SUMMARY

An apparatus for reducing vibration in a downhole component includes: an electrically conductive auxiliary mass attached to the downhole component and configured to vibrate in a direction corresponding to a direction of downhole component vibration and absorb a portion of the downhole component vibration; and a magnetic component configured to generate a magnetic field through the auxiliary mass having a direction at least partially perpendicular to the direction of auxiliary mass vibration, the magnetic field configured to induce a current in the auxiliary mass in response to the auxiliary mass vibration. The apparatus has an auxiliary mass vibration frequency tuned relative to a selected natural vibration frequency of the downhole component to reduce vibration of the downhole component, the auxiliary mass vibration frequency based on a magnetic stiffness of the auxiliary mass, the magnetic stiffness based on at least a strength of the magnetic field and a resistance of the auxiliary mass.

A system for reducing vibration in a downhole component includes a plurality of vibration reduction assemblies coupled to the downhole component, each of the vibration reduction assemblies including: an electrically conductive auxiliary mass attached to the downhole component and configured to vibrate in a direction corresponding to a direction of downhole component vibration and absorb a portion of the downhole component vibration; and a magnetic component configured to generate a magnetic field through the auxiliary mass having a direction at least partially perpendicular to the direction of auxiliary mass vibration, the magnetic field configured to induce a current in the auxiliary mass in response to the auxiliary mass vibration. Each of the plurality of vibration reduction assemblies has an auxiliary mass vibration frequency tuned relative to a different selected vibration frequency of the downhole component, each auxiliary mass vibration frequency based on a magnetic stiffness of a corresponding auxiliary mass, the magnetic stiffness based on a magnetic field strength through the corresponding auxiliary mass and a resistance of the corresponding auxiliary mass.

A method of reducing vibration includes: disposing a downhole component into a formation, the downhole component fixedly attached to a vibration reduction assembly, the vibration reduction assembly including an electrically conductive auxiliary mass attached to the downhole component and configured to vibrate in a direction corresponding to a direction of downhole component vibration and absorb a portion of the downhole component vibration, and a magnetic component configured to generate a magnetic field through the auxiliary mass having a direction at least partially perpendicular to the direction of vibration of the auxiliary mass; generating the magnetic field through the auxiliary mass by a magnetic component, the magnetic field configured to induce a current in the auxiliary mass in response to auxiliary mass vibration, the current producing an electromotive force that resists the auxiliary mass vibration and provides a magnetic stiffness of the auxiliary mass; performing a downhole operation that produces the downhole component vibration having a selected natural vibration frequency; and reducing the amplitude of the downhole component vibration by vibrating the auxiliary mass in response to the downhole component vibration, the auxiliary mass having a vibration frequency that is tuned relative to the natural vibration frequency, the auxiliary mass vibration frequency based on the magnetic stiffness, the magnetic stiffness based on at least a strength of the magnetic field and a resistance of the auxiliary mass.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary apparatuses, systems and methods for reducing or mitigating harmful vibrations that occur in downhole components, such as drill strings and bottomhole assemblies (BHAs), during borehole operations. An embodiment includes utilization of an electromagnetic vibration reduction assembly disposed at one or more downhole components of a borehole string to mitigate vibrations occurring in the string. Exemplary vibrations include those occurring due to forward whirl, backward whirl and/or stick-slip conditions. In one embodiment, the electromagnetic vibration reduction assembly includes a tuned vibration absorber (TVA) and/or tuned mass damper (TMD) that dissipates energy created by vibration of the downhole component, and also converts vibrational energy into electrical energy that is used to resist component vibration. The vibration reduction assembly includes an electrically conductive auxiliary mass configured to vibrate in response to downhole component vibrations, and a magnetic component configured to provide a magnetic field that is fixedly positioned relative to the downhole component. The vibration reduction assembly may include, e.g., a permanent magnet to provide a constant magnetic field or an adjustable magnetic field generated by an inductor or electromagnet.

The vibration reduction assembly has a natural frequency based at least in part on the magnetic stiffness of the auxiliary mass, which depends on at least the strength of the magnetic field and resistance of the auxiliary mass. In one embodiment, the auxiliary mass is connected to a RCL circuit that can be configured to adjust the magnetic stiffness. For example, the resistance, capacitance and/or the inductance of the RCL circuit can be adjusted to change the magnetic stiffness. In one embodiment, a processor or controller is connected to the auxiliary mass and/or the RCL circuit and monitors the auxiliary mass response frequency. The processor may be configured to adjust the RCL circuit (e.g., adjust the capacitor or inductor) to maintain the response frequency at a desired or optimum value.

Figure 1:
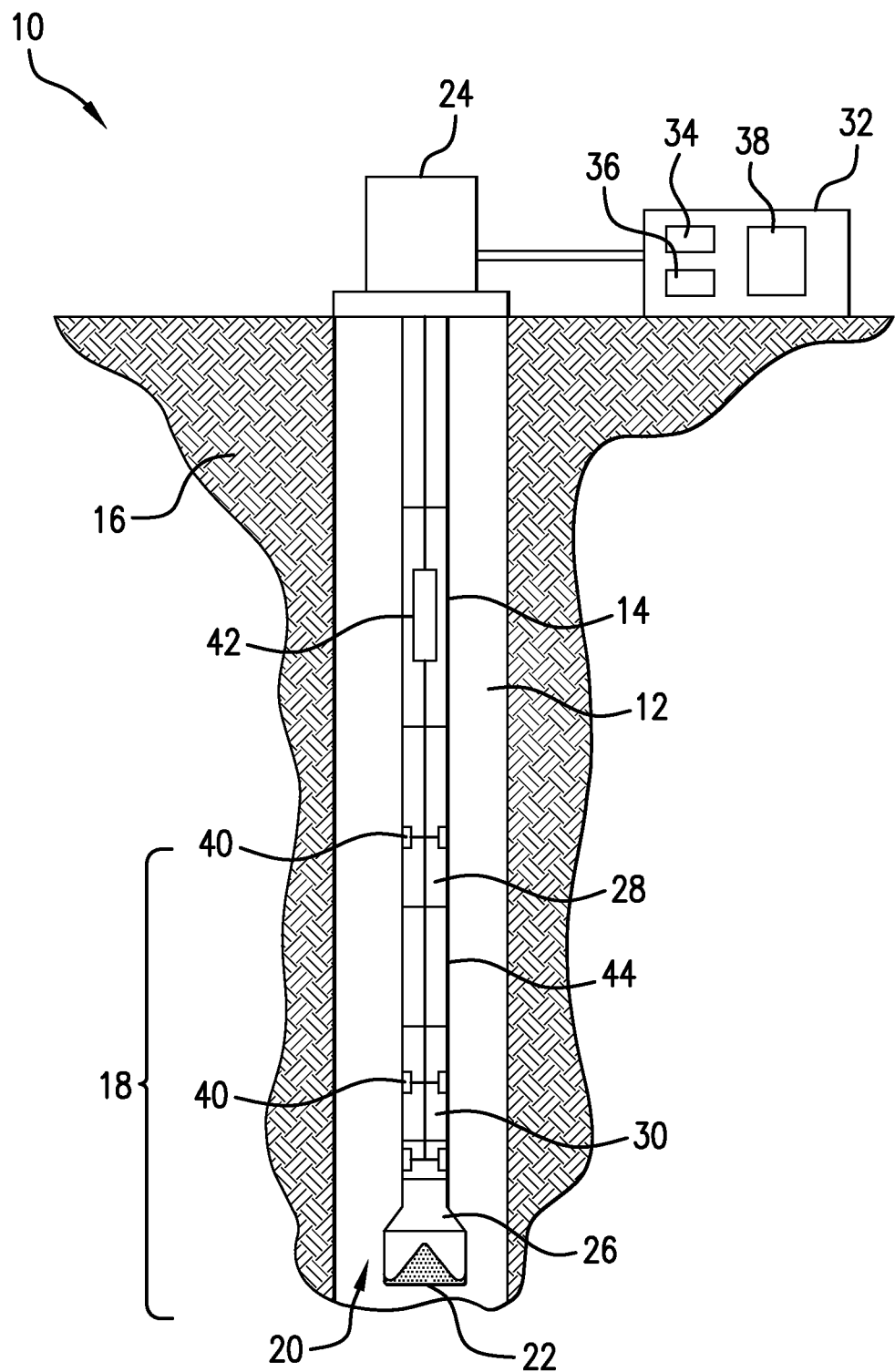
FIG. 1 depicts an exemplary embodiment of a drilling system including a drill string disposed in a borehole in an earth formation and a vibration reduction assembly.

Referring to FIG. 1, an exemplary embodiment of a downhole drilling system 10 disposed in a borehole 12 is shown. A drill string 14 is disposed in the borehole 12, which penetrates at least one earth formation 16. The drill string 14 is made from, for example, a pipe or multiple pipe sections. The system 10 and/or the drill string 14 include a drilling assembly 18. Various measurement tools may also be incorporated into the system 10 to affect measurement regimes such as logging-while-drilling (LWD) applications.

As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, bottomhole assemblies and drill strings.

The drilling assembly 18, which may be configured as a bottomhole assembly (BHA), includes a drill bit 20 that is attached to the bottom end of the drill string 14 via various drilling assembly components. The drilling assembly 18 is configured to be conveyed into the borehole 12 from a drilling rig 24. The drilling assembly components includes various components that provide structural and operational support to the drill bit 20 and to drill bit cutters 22, as well as operably connect the drill bit 20 and the cutters 22 to the drill string 14. Exemplary drilling assembly components include a drill bit body 26 operably connected to the cutters 22, and other drilling assembly components 30, such as a drilling motor, stabilizer and/or steering assembly.

A processing unit 32 is connected in operable communication with the drilling assembly 18 and may be located, for example, at a surface location, a subsea location and/or a surface location on a marine well platform or a marine craft. The processing unit 32 may also be incorporated with the drill string 14 or the drilling assembly 18, or otherwise disposed downhole as desired. The processing unit 32 may be configured to perform functions such as controlling the drilling assembly 18, transmitting and receiving data, processing measurement data, monitoring the drilling assembly 18, and performing simulations of the drilling assembly 18 using mathematical models. The processing unit 32, in one embodiment, includes a processor 34, a data storage device (or a computer-readable medium) 36 for storing, data, models and/or computer programs or software 38.

In one embodiment, the drill bit 20 and/or drilling assembly 18 includes one or more sensors 40 and related circuitry for estimating one or more parameters relating to the drilling assembly 18. For example, a distributed sensor system (DSS) is disposed at the drilling assembly 18 and includes a plurality of sensors 40. The sensors 40 perform measurements associated with the motion of the drilling assembly 18 and/or the drill string 14, and may also be configured to measure environmental parameters such as temperature and pressure. Non-limiting examples of measurements performed by the sensors include vibrations, accelerations, velocities, distances, angles, forces, moments, and pressures. In one embodiment, the sensors 40 are coupled to a downhole electronics unit 42, which may receive data from the sensors 40 and transmit the data to a processing system such as the processing unit 32. Various techniques may be used to transmit the data to the processing unit 32, such as mud pulse, electromagnetic, acoustic telemetry, or wired pipe.

The system 10 includes a vibration reduction assembly 44 configured to mitigate vibrations experienced by BHAs or other downhole components. Vibrations that could affect various parts of the system 10 (e.g., BHAs, Logging-while-drilling subs, drill bits and others) include vibrations due to axial movement, e.g., bit bounce, lateral vibrations such as whirl, and torsional vibrations such as stick-slip behaviors. In one embodiment, the vibration reduction assembly 44 is configured to counteract or mitigate vibrations due to forward and backward whirl and bit bounce. The damping assembly 44 may be configured to mitigate other causes of vibration, such as stick and slip types of vibrations. Vibrations can be experienced at various frequencies, and thus vibration frequencies that can be mitigated or reduced by the vibration reduction assembly 44 are not limited to the specific examples described herein.

In one embodiment, the vibration reduction assembly 44 includes a downhole Tuned Vibrating Absorber (TVA) and/or Tuned Mass Damper (TMD) to reduce the amplitude of selected vibrations. TVAs and TMDs are systems that use the energy of vibration to create a counteracting spring force that reduces the amplitude of the main body. Such systems are tuned to operate at selected frequencies, e.g., at or near natural and non-natural frequencies of a vibrating downhole component. In most cases, when tuned properly, such systems can reduce about 80% to 90% of the vibration amplitude. Both TVAs and TMDs include an inertia element or auxiliary mass that is configured to vibrate in response to downhole component vibration. The auxiliary mass provides an added degree of freedom attached to the vibrating primary mass to eliminate or attenuate the magnitude of vibration. The auxiliary mass has a stiffness and/or is connected to a resilient element having some stiffness (e.g. a spring and/or an electromagnetic assembly). TMDs may include additional energy dissipating elements, i.e., dampers, such as damping fluids.

The auxiliary mass is coupled to a primary mass that, in one embodiment, is associated with a drilling or other downhole component (e.g., a portion of the string 14). For example, the primary mass may be any suitable component of the string 14, such as a pipe section, the drilling assembly 18 or a separate component or subassembly such as a damper sub. However, the vibration reduction assemblies described herein are not limited to such applications, and may be utilized with any suitable vibrating primary mass.

For example, a system including a vibration reduction assembly includes an auxiliary mass md, also referred to as an inertia mass, that has a stiffness Kd and a damping coefficient Cd. The auxiliary mass md is coupled to a vibrating primary mass or main body m having a stiffness K1 and a damping coefficient C1. A free body diagram of the system including the primary mass m and the auxiliary mass md can be calculated to generate a two degrees of freedom model of the system. Such a calculation yields the following equations, where x and y are the displacements of the main body m and the mass damper body md, respectively:

$$m\left(\frac{d^2}{dt^2}x\right) + K1 \cdot x + Kd \cdot (x-y) + C1 \cdot \left(\frac{d}{dt}x\right) + Cd \cdot \left(\frac{d}{dt}x - \frac{d}{dt}y\right) =$$
$$Fo \cdot \sin(wt)$$

$$md \cdot \left(\frac{d^2}{dt^2}y\right) + Kd \cdot (y-x) + Cd \cdot \left(\frac{d}{dt}y - \frac{d}{dt}x\right) = 0,$$

In these equations, the harmonic force is represented by F(t). F(t)=Fo*sin(wt), where Fo is the force amplitude and w is the frequency.

Figure 2:
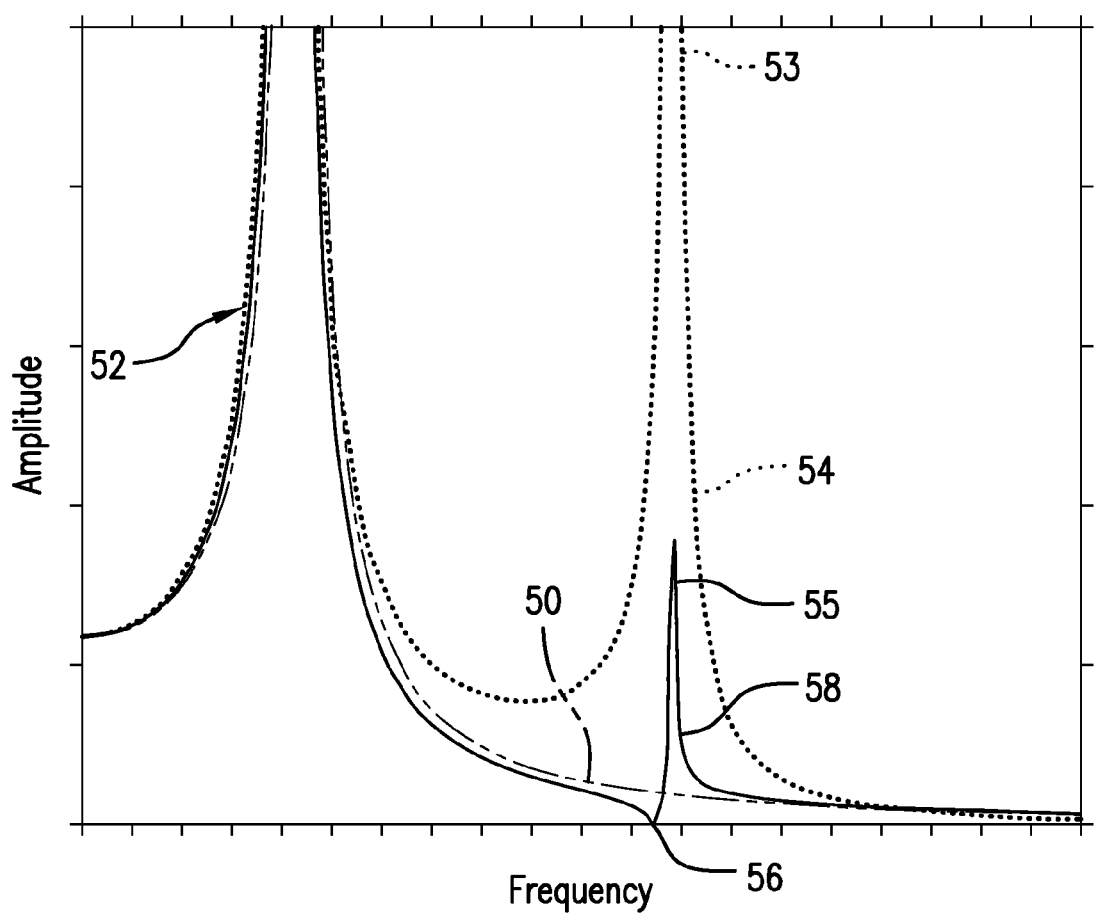
FIG. 2 depicts a representation of exemplary vibration frequencies of a downhole component and the vibration reduction assembly.

FIG. 2 illustrates exemplary frequency spectra derived from solving the two degrees of freedom model described above for different frequencies of excitation, which illustrates the effect of a vibration reduction assembly on vibration amplitudes. An undamped frequency spectrum 50 represents the amplitude of vibration of the main body m if no auxiliary mass is used. The system represented by spectrum 50 shows one natural frequency (shown by peak 52) due to its single degree of freedom. An auxiliary mass spectrum 54 represents the amplitude of vibration of the auxiliary mass md, which includes two natural frequencies (shown by peaks 52 and 53) for being a two degree of freedom system.

A combined spectrum 58 represents the amplitude of vibration of the main body m using the auxiliary mass md. The system shows two natural frequencies (at peaks 52 and 55) due to the second degree of freedom added by the auxiliary mass. The lowest amplitude of vibration of the main body occurs when the vibrating frequency of the main body matches the natural frequency of the auxiliary mass as a single degree of freedom (as shown at peak 56).

Figure 3:
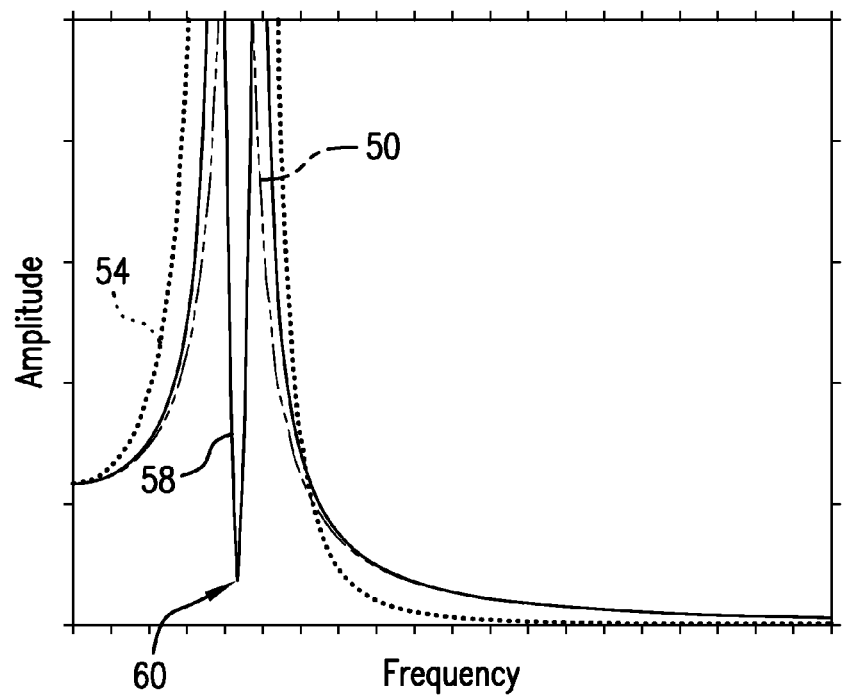
FIG. 3 depicts a representation of exemplary vibration frequencies of a downhole component and the vibration reduction assembly.

The natural frequency of the vibration reduction assembly can be controlled by changing its mass or equivalent stiffness, and therefore changing the amplitude of the main body at that particular frequency. This is demonstrated by FIG. 3, which shows the primary mass spectrum 50 having a natural frequency as a single degree of freedom. In this example, the vibration reduction assembly has been tuned to have the same natural frequency (as a single degree of freedom) as the main body m, which is shown by spectrum 54. As is shown in the combined spectrum 58, the vibration reduction assembly is able to reduce the amplitude of vibrations (see peak 60) at the natural frequency of the main body.

Figure 4:
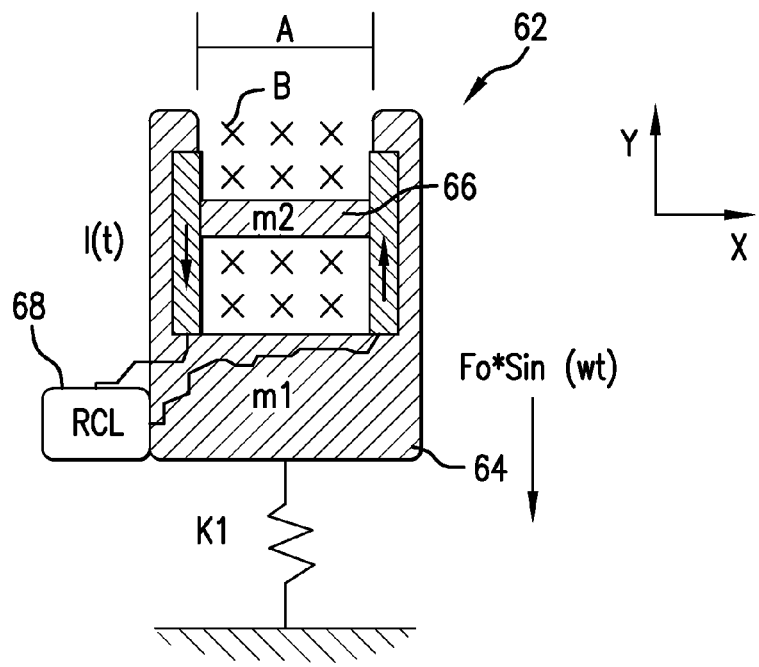
FIG. 4 depicts an exemplary embodiment of an electromagnetic vibration reduction assembly.

Referring to FIG. 4, an embodiment of an electromagnetic vibration reduction assembly 62 is coupled to a primary mass 64, such as a drill string or other downhole component. The primary mass has a mass m1 and a stiffness k1. The assembly 62 includes a conductive auxiliary mass, at least a portion of which is electrically conductive. In this embodiment, the auxiliary mass is an electrically conductive bar 66. Although the auxiliary mass is described herein as a bar, it is not so limited, as the auxiliary mass can be of any type or configuration that provides an at least partially conductive mass that has freedom of movement in a direction corresponding to a direction of the primary mass vibration.

In this embodiment, the bar 66 is configured to have some freedom of movement in the Y-direction and has a length A in the X-direction. The bar 66 is considered to be the auxiliary mass and has a mass m2. In this embodiment, the bar 66 is electrically conductive and connected to a circuit, e.g., a RCL circuit 68 that includes a resistor having resistance R, an inductor having inductance L and a capacitor having capacitance C. The resistor, inductor and capacitor may be connected in series, in parallel or a combination of both.

A magnetic field B having a direction perpendicular or at least partially perpendicular to the length A (i.e., perpendicular to the x-direction) is applied to the conductive bar 66. Movement or vibration of the primary mass 64 causes movement of the bar 66 in the Y-direction. A voltage is produced between the ends of the bar 66, which in turn causes a current I(t) through the bar 66 and in the RCL circuit. In this way, kinetic energy from the vibration is converted into electrical energy, which in turn provides a reaction force that is used to resist the vibration force of the primary mass 64. This resistance provides "magnetic stiffness" to the conductive bar 66, which can be set or adjusted by setting or adjusting the magnetic field B through the bar 66 and the resistance of the bar 66. The magnetic stiffness can also be adjusted or set by adjusting or setting the capacitance and the inductance of the RCL circuit 68.

The reaction force can be calculated as shown below. By solving the free body diagram of FIG. 4 and considering the Faraday's Law equations, the following system of differential equations can be derived:

$$Fmag = I(t) \cdot A \cdot B$$
$$m2 \cdot \frac{d^2}{dt^2}y(t) - Fmag = 0$$
$$m1 \cdot \frac{d^2}{dt^2}x(t) + K1 \cdot x(t) + Fmag = Fo \cdot \sin(wt)$$
$$L \cdot \frac{d^2}{dt^2}I(t) + R \cdot \frac{d}{dt}I(t) + \frac{1}{C} \cdot I(t) = B \cdot A \cdot \left(\frac{d}{dt}x - \frac{d}{dt}y\right)$$

The external force applied to the main body 64 is a harmonic force F(t) representing vibrations of different frequencies. As indicated above, the harmonic force can be represented as F(t)=Fo*sin(wt). x(t) and y(t) are the displacements of the main body 64 and the bar 66, respectively. Fmag is the magnitude of the reaction force generated between the main body 64 and the conducting bar 66 due to the induced current and the permanent magnetic field B fixed to the main body 64.

Figure 5:
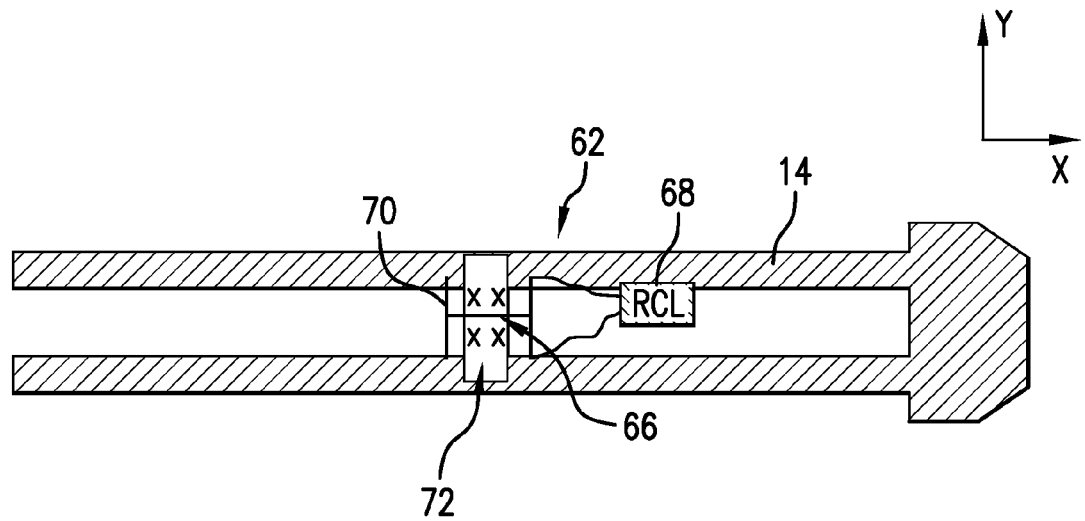
FIG. 5 depicts an exemplary embodiment of an electromagnetic vibration assembly coupled to the drill string of FIG. 1.

FIG. 5 illustrates an embodiment of the vibration reduction assembly 62 disposed with a downhole component such as the drill string 14. In this embodiment, the auxiliary mass, e.g., the bar 66, is configured to vibrate in a lateral direction (e.g., the Y-direction) that is perpendicular to an axial direction of the drill string 14 (e.g., the X-direction), in order to counteract lateral vibrations such as those found in forward and/or backward whirl conditions. The direction of movement may not be precisely perpendicular to the axial direction, but may instead be partially perpendicular, i.e., having a perpendicular directional component. The embodiments described herein are not so limited, as the bar 66 or other auxiliary mass can be configured to move in any desired direction. For example, the mass may be configured to vibration torsionally to counteract torsional vibrations, e.g., stick-slip vibrations, or may be configured to vibrate in an axial direction to counteract axial vibrations such as bit bounce vibrations.

The conductive auxiliary mass or bar 66 is attached or otherwise affixed to the drill string 14 such that the bar 66 can vibrate in the desired direction. For example, the bar can be attached directly to the drill string or indirectly via some housing or structure. For example, the bar 66 is coupled to the drill string 14 by a structure 70 attached to the drill string 14. The structure may be a resilient structure, e.g., including one or more springs extending laterally, or other resilient component. In other examples, the bar 66 is itself resilient and is attached to a relatively rigid structure 70. The bar 66 can be attached via any structure or mechanism that allows the bar 66 to vibrate and absorb energy from the drill string.

The magnetic field B, in this embodiment, is provided by a permanent magnet 72 that is attached or otherwise fixedly positioned relative to the drill string 14. The magnet 72 is configured to produce a magnetic field configured such that the magnetic lines of flux through the bar 66 have a direction that is at least substantially perpendicular to the direction of movement of bar 66.

Figure 6:
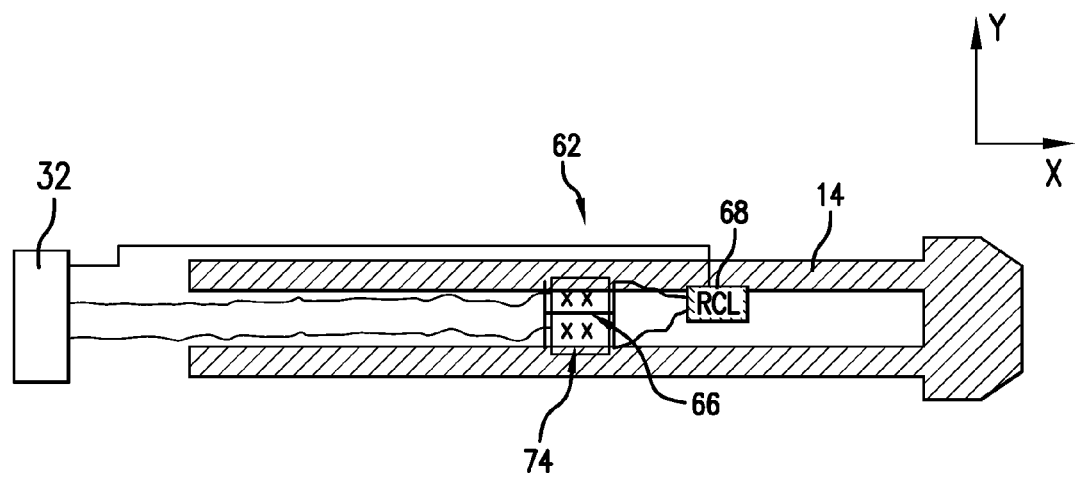
FIG. 6 depicts an exemplary embodiment of an electromagnetic vibration reduction assembly coupled to the drill string of FIG. 1.

FIG. 6 illustrates an embodiment of the assembly 62 that includes a magnetic component configured to generate an adjustable magnetic field. FIG. 6 shows a DC current loop 74 connected to a power source and controller for providing the magnetic field. In one example, the current loop 74 is connected to the processing unit 32.

A RCL circuit 68 is disposed downhole with the vibration reduction assembly 62 and has a resistance, inductance and capacitance configured to regulate an electromotive reaction force that counteracts the vibration of the drill string 14. The resistance, inductance and/or capacitance may be set to tune the vibration reduction assembly, e.g., using the equations discussed in conjunction with FIG. 4. The tuned frequency of the vibration reduction assembly 62 is based the magnetic stiffness of the auxiliary mass, which depends on at least the strength of the magnetic field and the resistance, capacitance and inductance of the RCL circuit. Thus, the assembly frequency can be adjusted by adjusting one or more of the magnetic field strength, the resistance, the capacitance and the inductance.

In one embodiment, the vibration reduction assembly 62 is adjustable to allow for automatic (self-tuning) or user-controlled adjustment or tuning during a downhole operation. For example, as shown in FIG. 6, the RCL circuit 68 and/or the magnetic component are connected to one or more controllers (e.g., the processing unit 32 or downhole unit 42).

In one embodiment, the RCL circuit 68 is in communication with a controller configured to record or monitor the response frequency of the bar 66 and adjust the operating frequency of the assembly 62 accordingly. For example, once the auxiliary mass response is converted into current and voltage, the controller measures current, voltage and/or movement and tunes the capacitor(s) and/or inductor(s) in the RCL circuit 68 to maintain the assembly 62 at or near a desired frequency and thereby maintain vibration of the main body at a minimum or reduced amplitude.

In embodiments where the assembly 62 includes a spring or other resilient component in addition to the bar 66, the natural frequency of the assembly 62 as a single degree of freedom may be considered to be a function of the total stiffness, which includes a combination in parallel of the magnetic stiffness of the bar 66 and spring stiffness of the resilient component. It is noted that the bar 66 may have both magnetic stiffness properties and spring stiffness properties, which would be similarly considered.

For example, when determining and/or adjusting the operating frequency of the assembly 62, the stiffness of the spring or other resilient component (e.g., the structure 70) and/or the spring stiffness of the bar 66 (or other auxiliary mass) can be sized to achieve the desired order of magnitude for the natural frequency. The magnetic stiffness and magnetic mass (i.e., capacitance and inductance) may also be set as described above, and can be adjusted to fine tune the assembly 62 to a particular frequency. This can allow the inductor(s) and capacitor(s) to be limited to a minimum size, while still providing the ability to make small adjustments. This would be particularly advantageous in applications such as borehole application where space to accommodate various components can be limited.

Figure 7:
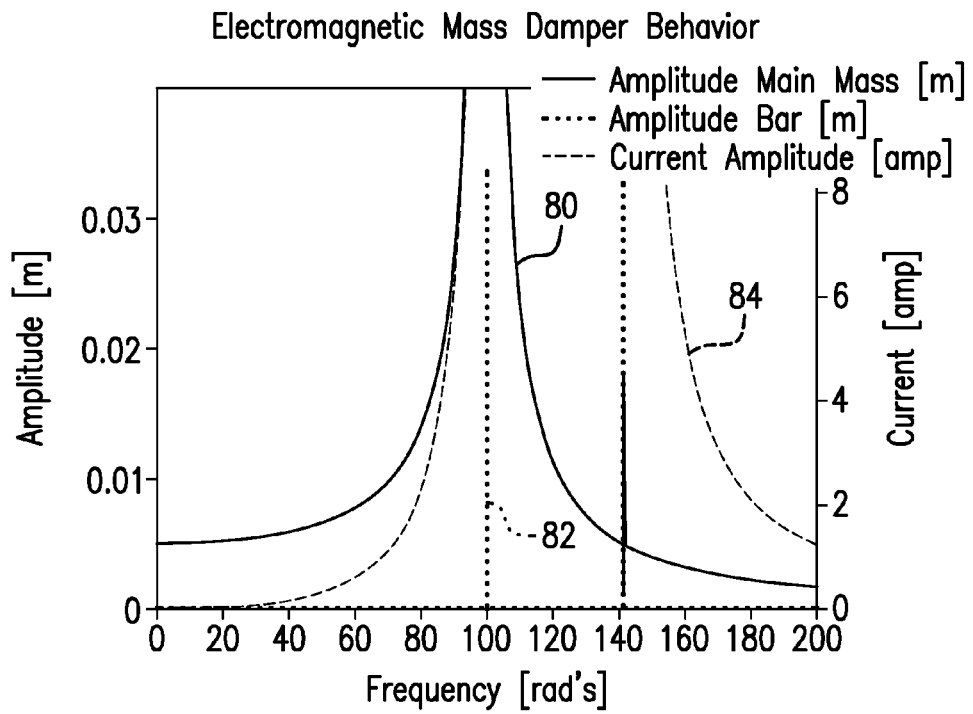
FIG. 7 depicts a representation of exemplary vibration frequencies of the drill string and the electromagnetic vibration reduction assembly of FIG. 5.
Figure 8:
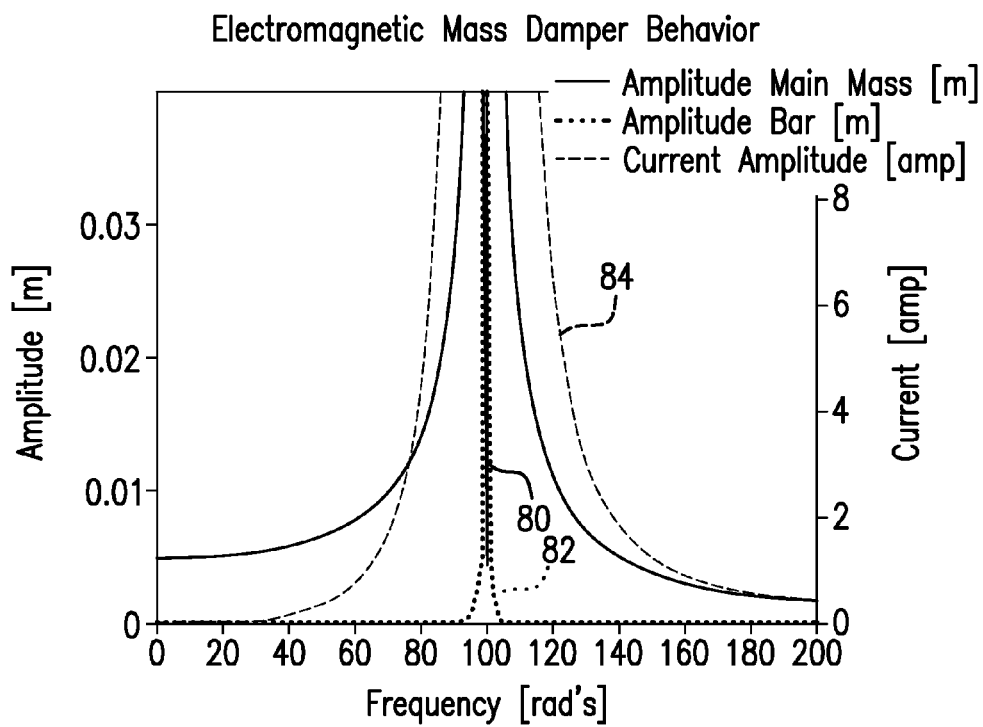
FIG. 8 depicts a representation of exemplary vibration frequencies of the drill string and the electromagnetic vibration reduction assembly of FIG. 5.

FIGS. 7 and 8 show exemplary responses of the assembly 62 and the drill string 14 of FIG. 5. As shown herein, tuning the assembly 62 to a frequency that is at least close to the string 14 vibration frequency results in a dramatic decrease in string vibration. Referring to FIG. 7, curve 80 shows the vibration amplitude of the drill string 14 with the assembly 62 and curve 82 shows the vibration amplitude of the assembly 62. Both have two degrees of freedom and therefore have two natural frequencies. The current amplitude in the bar 66 is shown by curve 84. As shown in FIG. 8, when the natural frequency of the assembly 62 as a single degree of freedom is matched to the natural frequency of the drill string 14 in a single degree of freedom, the amplitude of vibration of the drill string 14 is reduced significantly. It is noted that FIGS. 2, 3, 7 and 8 show a comparison between a model with single degree of freedom system (e.g., no TVA or MD) with a model of a two degree of freedom system (e.g., TVA or MD installed). A primary mass configured as a drill string or other downhole component may have a more complicated initial response (e.g., may have more than one natural frequency to start with), however this initial response will not affect the performance of the vibration reduction assembly.

Figure 9:
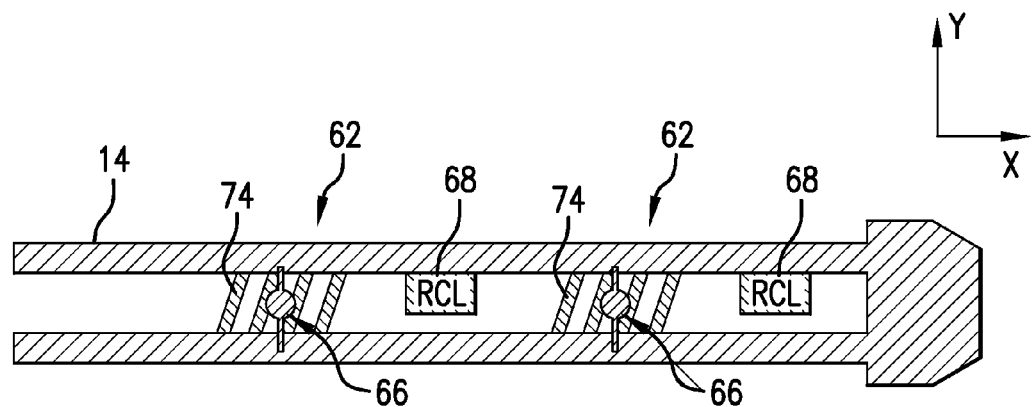
FIG. 9 depicts an exemplary embodiment of a vibration reduction system including a plurality of electromagnetic vibration reduction assemblies coupled to the drill string of FIG. 1.

FIG. 9 shows an embodiment of a downhole component or components (e.g., the drill string 14) that include multiple vibration reduction assemblies 62. The assemblies may be disposed in parallel at selected locations along the drill string 14, and if tuned to the same frequency can reduce the amplitude of the string vibration even further.

Figure 10:
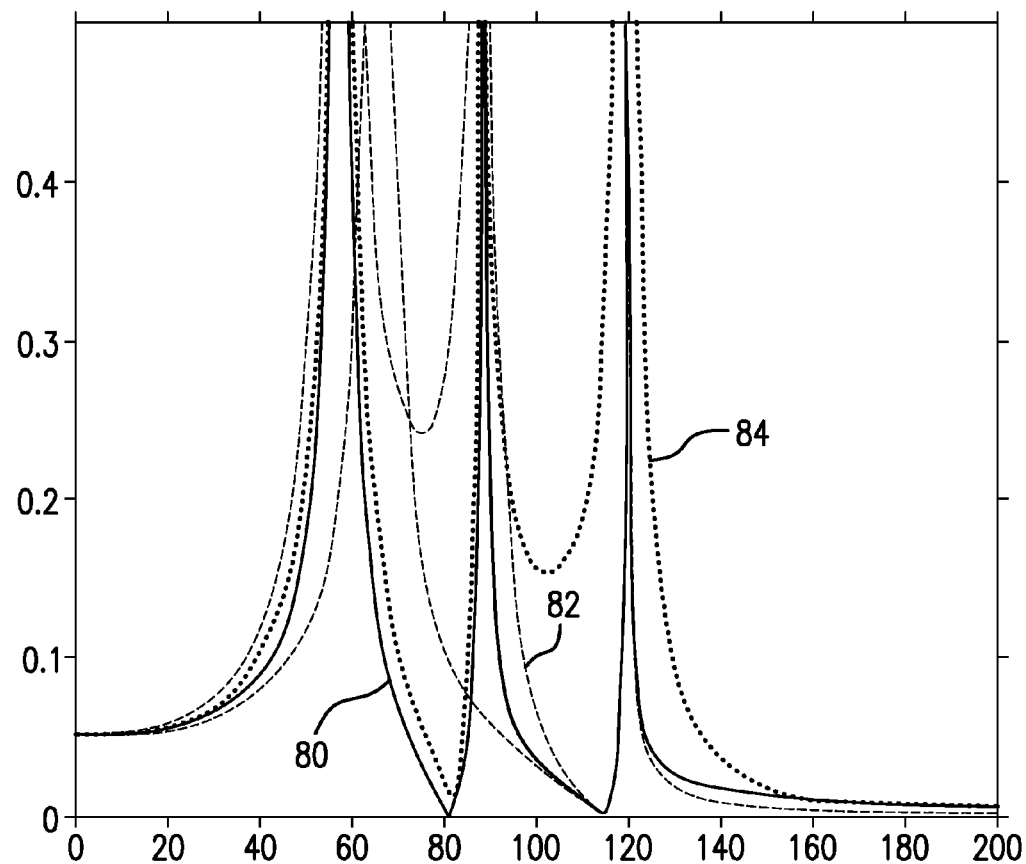
FIG. 10 depicts a representation of exemplary vibration frequencies of the drill string and the electromagnetic vibration reduction assemblies of FIG. 9.

In one embodiment, one or more of the assemblies 62 are tuned to different frequencies, in order to provide vibration reduction at multiple frequencies. In addition, one or more of the assemblies 62 can be configured to reduce different types of vibrations and/or different vibrational directions. For example, one or more of the bars 66 (and the corresponding magnetic field) are oriented so that the bar 66 vibrates torsionally to reduce stick-slip vibrations. Such capability is valuable because the string could experience more than one type of vibration, e.g., synchronous whirl (1×) and half synchronous whirl (0.5×). This effect is demonstrated, for example, in FIG. 10, which shows the vibration amplitude of the main body (curve 80) reduced at multiple frequencies associated with each assembly 62.

The systems, apparatuses and methods described herein provide various advantages over prior art techniques. Embodiments described herein to effectively harness kinetic energy from a vibrating body, convert that energy to electrical energy and use it to counteract the vibration. In addition, the embodiments described herein may include semi-active and/or active designs, having the capability to modify parameters such as magnetic stiffness adaptively, such that vibration can be effectively mitigated even as vibrational forces change downhole.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 32. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for reducing vibration in a downhole component, comprising:
    an electrically conductive auxiliary mass attached to the downhole component and configured to vibrate in a direction corresponding to a direction of downhole component vibration and absorb a portion of the downhole component vibration; and
    a magnetic component configured to generate a magnetic field through the auxiliary mass having a direction at least partially perpendicular to the direction of auxiliary mass vibration, the magnetic field configured to induce a current in the auxiliary mass in response to the auxiliary mass vibration;
    the apparatus having an auxiliary mass vibration frequency tuned relative to a selected natural vibration frequency of the downhole component to reduce vibration of the downhole component, the auxiliary mass vibration frequency based on a magnetic stiffness of the auxiliary mass, the magnetic stiffness based on at least a strength of the magnetic field and a resistance of the auxiliary mass.

2. The apparatus of claim 1, further comprising an electrical circuit connected to the auxiliary mass, the electrical circuit being adjustable to adjust the magnetic stiffness.

3. The apparatus of claim 2, wherein the electrical circuit includes a resistor, a capacitor and an inductor.

4. The apparatus of claim 3, further comprising a controller in communication with the electrical circuit, the controller configured to estimate the auxiliary mass vibration frequency and adjust at least one of the capacitance and the inductance.

5. The apparatus of claim 1, further comprising a controller in communication with the electrical circuit, the controller configured to estimate the auxiliary mass vibration frequency and adjust the magnetic stiffness in response to the estimated auxiliary mass vibration frequency.

6. The apparatus of claim 5, wherein the magnetic component is an adjustable magnet, and the controller is configured to adjust the magnetic stiffness by adjusting the magnetic field.

7. The apparatus of claim 1, wherein the apparatus is configured to be tuned so that the auxiliary mass vibration frequency corresponds to the selected natural vibration frequency of the downhole component.

8. The apparatus of claim 1, wherein the auxiliary mass is configured to vibrate in a lateral direction to reduce at least one of: forward whirl vibrations, backward whirl vibrations and stick-slip vibrations.

9. A system for reducing vibration in a downhole component, comprising:
    a plurality of vibration reduction assemblies coupled to the downhole component, each of the vibration reduction assemblies including:
    an electrically conductive auxiliary mass attached to the downhole component and configured to vibrate in a direction corresponding to a direction of downhole component vibration and absorb a portion of the downhole component vibration; and
    a magnetic component configured to generate a magnetic field through the auxiliary mass having a direction at least partially perpendicular to the direction of auxiliary mass vibration, the magnetic field configured to induce a current in the auxiliary mass in response to the auxiliary mass vibration;
    each of the plurality of vibration reduction assemblies having an auxiliary mass vibration frequency tuned relative to a different selected vibration frequency of the downhole component, each auxiliary mass vibration frequency based on a magnetic stiffness of a corresponding auxiliary mass, the magnetic stiffness based on a magnetic field strength through the corresponding auxiliary mass and a resistance of the corresponding auxiliary mass.

10. The system of claim 9, further comprising a controller in communication with at least one of the vibration reduction assemblies, the controller configured to estimate the auxiliary mass vibration frequency of the at least one of the vibration reduction assemblies and adjust the magnetic stiffness in response to the estimated auxiliary mass vibration frequency relative to a natural vibration frequency of the downhole component.

11. The system of claim 9, wherein each of the plurality of vibration reduction assemblies includes an electrical circuit connected to a corresponding auxiliary mass, the electrical circuit including a resistor, a capacitor and an inductor.

12. The system of claim 11, further comprising a controller in communication with the electrical circuit in at least one of the vibration reduction assemblies, the controller configured to estimate the auxiliary mass vibration frequency of the at least one of the vibration reduction assemblies and adjust at least one of capacitance and inductance of the electrical circuit.

13. A method of reducing vibration, comprising:
disposing a downhole component into a formation, the downhole component fixedly attached to a vibration reduction assembly, the vibration reduction assembly including an electrically conductive auxiliary mass attached to the downhole component and configured to vibrate in a direction corresponding to a direction of downhole component vibration and absorb a portion of the downhole component vibration, and a magnetic component configured to generate a magnetic field through the auxiliary mass having a direction at least partially perpendicular to the direction of vibration of the auxiliary mass;
generating the magnetic field through the auxiliary mass by a magnetic component, the magnetic field configured to induce a current in the auxiliary mass in response to auxiliary mass vibration, the current producing an electromotive force that resists the auxiliary mass vibration and provides a magnetic stiffness of the auxiliary mass;
performing a downhole operation that produces the downhole component vibration having a selected natural vibration frequency; and
reducing the amplitude of the downhole component vibration by vibrating the auxiliary mass in response to the downhole component vibration, the auxiliary mass having a vibration frequency that is tuned relative to the natural vibration frequency, the auxiliary mass vibration frequency based on the magnetic stiffness, the magnetic stiffness based on at least a strength of the magnetic field and a resistance of the auxiliary mass.

14. The method of claim 13, further comprising tuning the auxiliary mass vibration frequency via an electrical circuit connected to the auxiliary mass.

15. The method of claim 14, further comprising estimating the auxiliary mass vibration frequency by a controller and tuning the auxiliary mass vibration frequency during the downhole operation in response to the estimated vibration frequency.

16. The method of claim 14, wherein tuning the auxiliary mass vibration includes adjusting the magnetic stiffness by adjusting the magnetic field.

17. The method of claim 14, wherein tuning the auxiliary mass vibration frequency includes adjusting the auxiliary mass vibration frequency during the downhole operation to maintain the auxiliary mass vibration frequency at a selected value corresponding to the natural vibration frequency of the downhole component.

18. The method of claim 14, wherein the electrical circuit includes a resistor, a capacitor and an inductor.

19. The method of claim 18, wherein tuning the auxiliary mass vibration includes adjusting at least one of a capacitance of the capacitor and an inductance of the inductor.

* * * * *